United States Patent
Zhao et al.

(10) Patent No.: US 11,502,809 B2
(45) Date of Patent: Nov. 15, 2022

(54) METHOD AND APPARATUS OF INDICATING SYNCHRONIZATION SIGNAL BLOCK, METHOD AND APPARATUS OF DETERMINING SYNCHRONIZATION SIGNAL BLOCK, BASE STATION, USER EQUIPMENT AND STORAGE MEDIUM

(71) Applicant: CHINA ACADEMY OF TELECOMMUNICATIONS TECHNOLOGY, Beijing (CN)

(72) Inventors: Zheng Zhao, Beijing (CN); Ren Da, Beijing (CN); Bin Ren, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 302 days.

(21) Appl. No.: 16/623,376

(22) PCT Filed: May 30, 2018

(86) PCT No.: PCT/CN2018/089025
§ 371 (c)(1),
(2) Date: Dec. 16, 2019

(87) PCT Pub. No.: WO2018/228196
PCT Pub. Date: Dec. 20, 2018

(65) Prior Publication Data
US 2020/0178188 A1 Jun. 4, 2020

(30) Foreign Application Priority Data
Jun. 16, 2017 (CN) .......................... 201710459755.1

(51) Int. Cl.
*H04L 5/00* (2006.01)
*H04L 5/10* (2006.01)
(Continued)

(52) U.S. Cl.
CPC .......... *H04L 5/0094* (2013.01); *H04L 5/0048* (2013.01); *H04L 5/0051* (2013.01);
(Continued)

(58) Field of Classification Search
CPC ............ H04W 56/001; H04W 72/0446; H04L 5/0051; H04L 5/10
See application file for complete search history.

(56) References Cited

U.S. PATENT DOCUMENTS

2015/0341164 A1 11/2015 Ratnakar et al.
2016/0212631 A1 7/2016 Shen et al.
(Continued)

FOREIGN PATENT DOCUMENTS

CN 105493547 A 4/2016
CN 106712883 A 5/2017
(Continued)

OTHER PUBLICATIONS

First Office Action and Search Report from CN app. No. 201710459755.1, dated Dec. 23, 2019, with English translation from Global Dossier.
(Continued)

*Primary Examiner* — Michael Thier
*Assistant Examiner* — Nevena Zecevic Sandhu
(74) *Attorney, Agent, or Firm* — Ladas & Parry, LLP

(57) ABSTRACT

A method of indicating a synchronization signal block (SSB), a method of determining SSB, an apparatus of indicating an SSB, an apparatus of determining an SSB, a base station, user equipment (UE) and a computer readable storage medium are provided. The method of indicating an SSB includes: determining a target pattern from a plurality of patterns and acquiring serial number information corresponding to the SSB based on the target pattern; determining, according to the serial number information correspond- (Continued)

ing to the SSB, position indication information in an indication signaling for indicating a corresponding position of the SSB; and transmitting the position indication information to UE.

17 Claims, 5 Drawing Sheets

(51) Int. Cl.
*H04W 56/00* (2009.01)
*H04W 72/04* (2009.01)
*H04L 27/26* (2006.01)

(52) U.S. Cl.
CPC ............ *H04L 5/10* (2013.01); *H04L 27/2613* (2013.01); *H04W 56/001* (2013.01); *H04W 72/0446* (2013.01)

(56) References Cited

U.S. PATENT DOCUMENTS

| | | | |
|---|---|---|---|
| 2017/0257139 A1 | 9/2017 | Axnas et al. | |
| 2019/0254026 A1* | 8/2019 | Liu | H04W 72/0453 |
| 2020/0068513 A1* | 2/2020 | Takeda | H04W 56/0045 |
| 2020/0154427 A1* | 5/2020 | Choi | H04W 72/0446 |
| 2021/0250302 A1* | 8/2021 | Loehr | H04W 4/40 |

FOREIGN PATENT DOCUMENTS

| | | |
|---|---|---|
| CN | 106793058 A | 5/2017 |
| CN | 107078869 A | 8/2017 |

OTHER PUBLICATIONS

Extended European Search Report from EP app. No. 18818402.2, dated May 4, 2020.
International Search Report from PCT/CN2018/089025, dated Aug. 8, 2018, with English translation from WIPO.
Written Opinion of the International Searching Authority from PCT/CN2018/089025, dated Aug. 8, 2018, with English translation from WIPO.
International Preliminary Report on Patentability from PCT/CN2018/089025, dated Dec. 17, 2019, with English translation from WIPO.
"SS Block Composition, SS Burst Set Composition and SS Time Index Indication", R1-1705837, 3GPP TSG-RAN WG1 Meeting #88bis, Spokane, WA, USA, Apr. 3-7, 2017.
"Consideration on SS block time index indication", R1-1707252, 3GPP TSG-RAN WG1 Meeting #89, Hangzhou, P.R. China, May 15-19, 2017.
"NR-PBCH design", R1-1707253, 3GPP TSG-RAN WG1 Meeting #89, Hangzhou, P.R. China, May 15-19, 2017.
"SS Burst Set and SS Block Configuration", R1-1707458, 3GPP TSG-RAN WG1 Meeting #89, Hangzhou, P.R. China, May 15-19, 2017.
"SS block time index indication", R1-1708233, 3GPP TSG-RAN WG1 Meeting #89, Hangzhou, P.R. China, May 15-19, 2017.

* cited by examiner

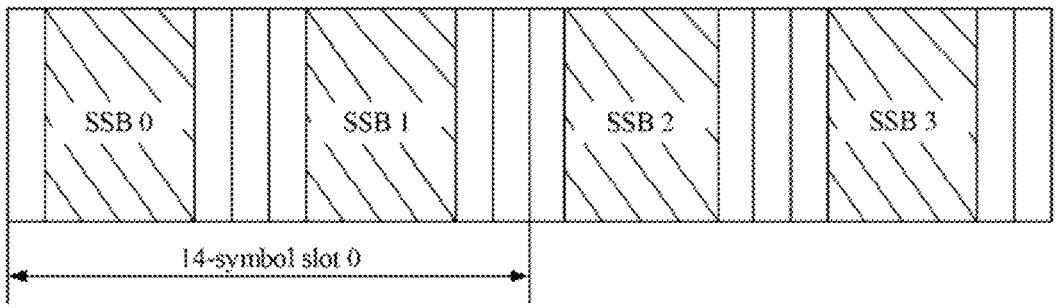
Fig. 4a
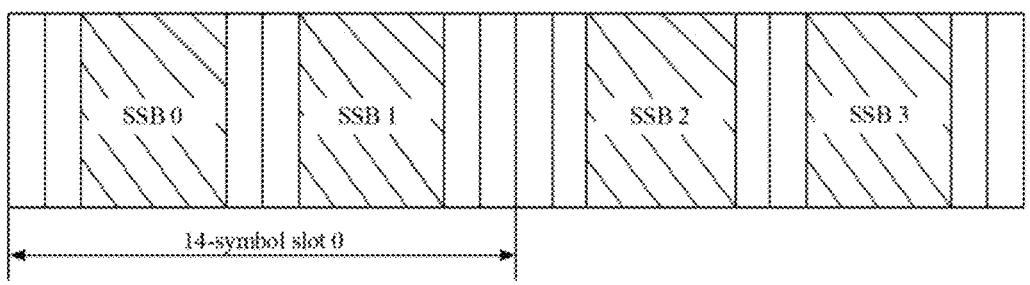
Fig. 4b
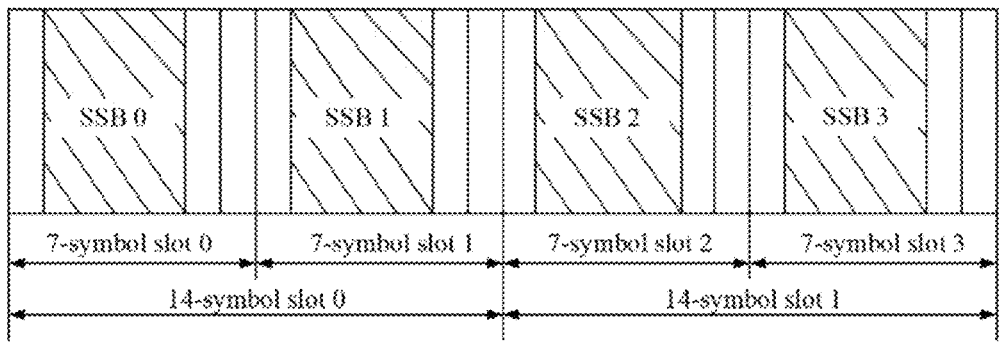
Fig. 5
determining, according to an SSB serial number of the SSB in a current period and slot structure information corresponding to the SSB, position indication information in an indication signaling for indicating a corresponding position of the SSB — 61
transmitting the position indication information to UE — 62
Fig. 6

METHOD AND APPARATUS OF INDICATING SYNCHRONIZATION SIGNAL BLOCK, METHOD AND APPARATUS OF DETERMINING SYNCHRONIZATION SIGNAL BLOCK, BASE STATION, USER EQUIPMENT AND STORAGE MEDIUM

CROSS-REFERENCE TO RELATED APPLICATIONS

This application is the U.S. national phase of PCT Application No. PCT/CN2018/089025 filed on May 30, 2018, which claims a priority to the Chinese patent application No. 201710459755.1 filed in China on Jun. 16, 2017, the disclosures of which are incorporated herein by reference in their entireties.

TECHNICAL FIELD

The present disclosure relates to the field of communication technology, in particular to a method of indicating a synchronization signal block (SS Block or SSB), a method of determining an SSB, an apparatus of indicating an SSB, an apparatus of determining an SSB, a base station, user equipment (UE) and a computer readable storage medium.

BACKGROUND

In New Radio (NR) mobile communications, a system transmits synchronization signals in different directions in a time division manner. The mode of transmitting synchronization signals is referred to as beam scanning mode. In an NR system, synchronization signals are transmitted in various directions according to a predetermined pattern.

In the NR system, an SSB includes three parts: a primary synchronization signal (PSS) occupying one symbol, a secondary synchronization signal (SSS) occupying one symbol and a physical broadcast channel (PBCH) occupying two symbols. When the SSBs are transmitted by using the beam scanning mode, one SSB is transmitted in each direction, and the SSBs in different directions are transmitted in different time instances, as shown in FIG. 1.

When UE performs a synchronization detection, a synchronization sequence may be detected. However, in so doing, only a relative position of the synchronization sequence is obtained and the UE is still unaware of serial numbers of a slot and a symbol in which the synchronization sequence is located. To derive such information, information regarding an SSB pattern and an SSB serial number should be provided to the UE.

However, in the related art, an indication signaling for the SSB serial number includes only information regarding an SSB serial number in a current period, and an SSB indication scheme involving multiple patterns cannot be supported.

SUMMARY

The present disclosure provides a method of indicating an SSB, a method of determining an SSB, an apparatus of indicating an SSB, an apparatus of determining an SSB, a base station, UE and a computer readable storage medium are provided, so as to address the issue in the related art that determination and indication schemes for SSB cannot support a situation involving multiple patterns.

In a first aspect, some embodiments of the present disclosure provide a method of indicating an SSB, including: determining a target pattern from a plurality of patterns and acquiring serial number information corresponding to the SSB based on the target pattern; determining, according to the serial number information corresponding to the SSB, position indication information in an indication signaling for indicating a corresponding position of the SSB; and transmitting the position indication information to UE.

Optionally, determining, according to the serial number information corresponding to the SSB, the position indication information in the indication signaling for indicating the corresponding position of the SSB Includes: determining the position indication information in the indication signaling for indicating the corresponding position of the SSB according to a position of the SSB in a pattern and an identifier of the pattern.

Optionally, determining the position indication information is in the indication signaling for indicating the corresponding position of the SSB according to the position of the SSB in the pattern and the identifier of the pattern includes: determining a corresponding serial number of the SSB in the indication signaling according to a serial number of the SSB in the pattern and a serial number of the pattern.

Optionally, transmitting the position indication information to the UE includes: mapping a part of the position indication information onto a predetermined demodulation reference signal (DMRS) sequence according to the identifier of the pattern and transmitting the DMRS sequence.

Optionally, before determining, according to the serial number information corresponding to the SSB, the position indication information in the indication signaling for indicating the corresponding position of the SSB, the method further includes: establishing a mapping relationship between the plurality of patterns and position indication information in the indication signaling according to priority information of the plurality of patterns.

Optionally, in the plurality of patterns, first SSBs always start from first symbols of respective slots, or always start from a second symbol of a corresponding slot, or some of the first SSBs start from first symbols of respective slots and the other start from second symbols of respective slots.

In a second aspect, some embodiments of the present disclosure further provide a method of determining an SSB, including: receiving position indication information in an indication signaling for indicating a corresponding position of the SSB, and the position indication information being transmitted by a base station; and determining, according to the position indication information, a slot and a position in the slot where an initial symbol of the SSB is located; where the position indication information is acquired by the base station based on a target pattern.

Optionally, determining, according to the position indication information, the slot and the position in the slot where the initial symbol of the SSB is located includes: determining serial number information corresponding to the SSB according to the position indication information; and determining the slot and the position in the slot where the initial symbol of the SSB is located according to the serial number information.

Optionally, determining the serial number information corresponding to the SSB according to the position indication information includes: determining an identifier of a pattern corresponding to the SSB and a position of the SSB in the pattern according to the position indication information.

Optionally, determining the slot and the position in the slot where the initial symbol of the SSB is located according to the serial number information includes: determining the slot and the position in the slot where the initial symbol of the SSB is located according to the identifier of the pattern corresponding to the SSB and the position of the SSB in the pattern.

Optionally, the position indication information in the indication signaling for indicating the corresponding position of the SSB includes a serial number of the SSB in the indication signaling, the identifier of the pattern corresponding to the SSB includes a serial number of the pattern corresponding to the SSB, and the position of the SSB in the pattern includes a serial number of the SSB in the pattern.

Optionally, determining the identifier of the pattern corresponding to the SSB and the position of the SSB in the pattern according to the position indication information is implemented by using following formula:

$$y=\lfloor x/a \rfloor;$$

$$z=\mathrm{mod}(x,a);$$

where y denotes the serial number of the pattern corresponding to the SSB, x denotes the serial number of the SSB in the indication signaling, z denotes the serial number of the SSB in the pattern, and a denotes the quantity of SSBs in each synchronization period; and, in case that the base station operates at a frequency from 0 GHz to 3 GHz, a is equal to 4, and in case that the base station operates at a frequency from 3 GHz to 6 GHz, a is equal to 8.

In a third aspect, some embodiments of the present disclosure further provide a method of indicating an SSB, including: determining, according to an SSB serial number of the SSB in a current period and slot structure information corresponding to the SSB, position indication information in an indication signaling for indicating a corresponding position of the SSB; and transmitting the position indication information to UE.

Optionally, the slot structure information indicates that a slot structure currently used by a base station is a 7-symbol slot structure or a 14-symbol slot structure.

In a fourth aspect, some embodiments of the present disclosure further provide a method of determining an SSB, including: receiving position indication information in an indication signaling for indicating a corresponding position of the SSB, and the position indication information being transmitted by a base station; and determining, according to the position indication information, an SSB serial number of the SSB in a current period and slot structure information corresponding to the SSB.

Optionally, determining, according to the position indication information, the slot structure information corresponding to the SSB includes: determining the slot structure information corresponding to the SSB according to the position indication information and a mapping relationship between a slot structure and position indication information for indicating a position in the indication signaling.

Optionally, the position indication information in the indication signaling for indicating the corresponding position of the SSB includes a serial number of the SSB in the indication signaling, and the slot structure information corresponding to the SSB indicates that a slot structure currently used by the base station is a 7-symbol slot structure or a 14-symbol slot structure.

Optionally, determining, according to the position indication information, the SSB serial number of the SSB in a current period and the slot structure information corresponding to the SSB is implemented by using following formula:

$$y=\lfloor x/a \rfloor;$$

$$z=\mathrm{mod}(x,a)$$

where y denotes an indicated value of the slot structure information, x denotes the serial number of the SSB in the indication signaling, z denotes the SSB serial number of the SSB in the current period, and a denotes the quantity of SSBs in each synchronization period;

in case that the base station operates at a frequency from 0 GHz to 3 GHz, a is equal to 4, and in case that the base station operates at a frequency from 3 GHz to 6 GHz, a is equal to 8; and y being equal to 0 represents that the slot structure currently used by the base station is a 14-symbol slot structure; and y being equal to 1 represents that the slot structure currently used by the base station is a 7-symbol slot structure.

In a fifth aspect, some embodiments of the present disclosure further provide an apparatus of indicating an SSB, including: a first processing module, configured to determine a target pattern from a plurality of patterns and acquire serial number information corresponding to the SSB based on the target pattern; a first determination module, configured to determine, according to the serial number information corresponding to the SSB, position indication information in an indication signaling for indicating a corresponding position of the SSB; and a first transmission module, configured to transmit the position indication information to UE.

Optionally, the first determination module includes: a first determination sub-module, configured to determine the position indication information in the indication signaling for indicating the corresponding position of the SSB according to a position of the SSB in a pattern and an identifier of the pattern.

Optionally, the first determination sub-module includes: a first determination unit, configured to determine a corresponding serial number of the SSB in the indication signaling according to a serial number of the SSB in the pattern and a serial number of the pattern.

Optionally, the first transmission module includes: a first transmission sub-module, configured to map a part of the position indication information onto a predetermined DMRS sequence according to the identifier of the pattern and transmit the DMRS sequence.

Optionally, the apparatus further includes: a first establishment module, configured to, before the position indication information in the indication signaling for indicating the corresponding position of the SSB is determined according to the serial number information corresponding to the SSB, establish a mapping relationship between the plurality of patterns and position indication information in the indication signaling according to priority information of the plurality of patterns.

Optionally, in the plurality of patterns, first SSBs always start from first symbols of respective slots, or always start from second symbols of respective slots, or some of the first SSBs start from first symbols of respective slots and the other start from second symbols of respective slots.

In a sixth aspect, some embodiments of the present disclosure further provide an apparatus of determining an SSB, including: a first reception module, configured to receive position indication information in an indication signaling for indicating a corresponding position of the SSB, and the position indication information being transmitted by a base station; and a second determination module, configured to determine, according to the position indication information, a slot and a position in the slot where an initial symbol of the SSB is located; where the position indication information is acquired by the base station based on a target pattern.

Optionally, the second determination module includes: a second determination sub-module, configured to determine serial number information corresponding, to the SSB according to the position indication information; and a third determination sub-module, configured to determine the slot and the position in the slot where the initial symbol of the SSB is located according to the serial number information.

Optionally, the second determination sub-module includes: a second determination unit, configured to determine an identifier of a pattern corresponding to the SSB and a position of the SSB in the pattern according to the position indication information.

Optionally, the third determination sub-module includes: a third determination unit, configured to determine the slot and the position in the slot where the initial symbol of the SSB is located according to the identifier of the pattern corresponding to the SSB and the position of the SSB in the pattern.

Optionally, the position indication information in the indication signaling for indicating the corresponding position of the SSB includes a serial number of the SSB in the indication signaling, the identifier of the pattern corresponding to the SSB includes a serial number of the pattern corresponding to the SSB, and the position of the SSB in the pattern includes a serial number of the SSB in the pattern.

Optionally, the second determination unit performs operation by using following formula:

$$y=\lfloor x/a \rfloor;$$

$$z=\mod(x,a);$$

where y denotes the serial number of the pattern corresponding to the SSB, x denotes the serial number of the SSB in the indication signaling, z denotes the serial number of the SSB in the pattern, and a denotes the quantity of SSBs in each synchronization period; and in case that the base station operates at a frequency from 0 GHz to 3 GHz, a is equal to 4, and in case that the base station operates at a frequency from 3 GHz to 6 GHz, a is equal to 8.

In a seventh aspect, some embodiments of the present disclosure further provide an apparatus of indicating an SSB, including: a third determination module, configured to determine, according to an SSB serial number of the SSB in a current period and slot structure information corresponding to the SSB, position indication information in an indication, signaling for indicating a corresponding position of the SSB; and a second transmission module, configured to transmit the position indication information to UE.

Optionally, the slot structure information indicates that a slot structure currently used by a base station is a 7-symbol slot structure or a 14-symbol slot structure.

In an eighth aspect, some embodiments of the present disclosure further provide an apparatus of determining an SSB, including: a second reception module, configured to receive position indication information in an indication signaling for indicating a corresponding position of the SSB, and the position indication information being transmitted by a base station; and a fourth determination module, configured to determine, according to the position indication information, an SSB serial number of the SSB in a current period and slot structure information corresponding to the SSB.

Optionally, the fourth determination module includes: a fourth determination sub-module, configured to determine the slot structure information corresponding to the SSB according to the position indication information and a mapping relationship between a slot structure and position indication information for indicating a position in the indication signaling.

Optionally, the position indication information in the indication signaling for indicating the corresponding position of the SSB includes a serial number of the SSB in the indication signaling, and the slot structure information corresponding to the SSB indicates that a slot structure currently used by the base station is a 7-symbol slot structure or a 14-symbol slot structure.

Optionally, the fourth determination module performs operation by using following formula:

$$y=\lfloor x/a \rfloor;$$

$$z=\mod(x,a);$$

where y denotes an indicated value of the slot structure information, x denotes the serial number of the SSB in the indication signaling, z denotes the SSB serial number of the SSB in the current period, and a denotes the quantity of SSBs in each synchronization period;

in case that the base station operates at a frequency from 0 GHz to 3 GHz, a is equal to 4, and in case that the base station operates at a frequency from 3 GHz to 6 GHz, a is equal to 8; and y being equal to 0 represents that the slot structure currently used by the base station is a 14-symbol slot structure; and y being equal to 1 represents that the slot structure currently used by the base station is a 7-symbol slot structure.

In a tenth aspect, some embodiments of the present disclosure further provide a base station, including: a storage, a processor and a computer program stored on the storage and executable by the processor, where when executing the program, the processor is configured to perform the method according to the first aspect.

In an eleventh aspect, some embodiments of the present disclosure further provide UE, including: a storage, a processor and a computer program stored on the storage and executable by the processor, where when executing the program, the processor is configured to perform the method according to the second aspect.

In a twelfth aspect, some embodiments of the present disclosure further provide a base station, including: a storage, a processor and a computer program stored on the storage and executable by the processor, where when executing the program, the processor is configured to perform the method according to the third aspect.

In a fourteenth aspect, some embodiments of the present disclosure further provide UE, including: a storage, a processor and a computer program stored on the storage and executable by the processor, where when executing the program, the processor is configured to perform the method according to the fourth aspect.

In a fifteenth aspect, some embodiments of the present disclosure further provide a non-volatile computer readable storage medium storing thereon a computer program, where the computer program is configured to be executed by a processor to implement the method according to the first aspect.

In a sixteenth aspect, some embodiments of the present disclosure further provide a non-volatile computer readable storage medium storing thereon a computer program, where the computer program is configured to be executed by a processor to implement the method according to the second aspect.

In a seventeenth aspect, some embodiments of the present disclosure further provide a non-volatile computer readable storage medium storing thereon a computer program, where the computer program is configured to be executed by a processor to implement the method according to the third aspect.

In an eighteenth aspect, some embodiments of the present disclosure further provide a non-volatile computer readable storage medium storing thereon a computer program, where the computer program is configured to be executed by a processor to implement the method according to the fourth aspect.

The foregoing technical solutions of the present disclosure have advantageous effects as follows: according to aforementioned solutions, by determining a target pattern from a plurality of patterns and acquiring serial number information corresponding to the SSB based on the target pattern, determining, according to the serial number information corresponding to the SSB, position indication information in an indication signaling for indicating a corresponding position of the SSB and transmitting the position indication information to UE, the method of indicating an SSB enables UE to acquire the serial number information from the position indication information and determine the identifier of the pattern corresponding to the SSB and the position of the SSB in the pattern, thereby resolving the synchronization signal correctly for a subsequent operation, and, as a result, solving the problem in the related art that the determination and indication schemes for SSB cannot support a situation involving multiple patterns.

BRIEF DESCRIPTION OF THE DRAWINGS

FIG. 4a is a schematic diagram of a correspondence between SSBs and slot symbols according to some embodiments of the present disclosure;

FIG. 4b is a schematic diagram of a correspondence between SSBs and slot symbols according to some embodiments of the present disclosure;

FIG. 5 is a schematic diagram of a correspondence between patterns and indication signaling according to some embodiments of the present disclosure;

FIG. 6 is a schematic flow chart of a method of indicating an SSB according to some embodiments of the present disclosure;

DETAILED DESCRIPTION

To describe the technical problem to be solved, the technical solutions and the advantages of the present disclosure more clearly, specific embodiments are described in detail hereinafter with reference to the accompanying drawings.

Figure 1:
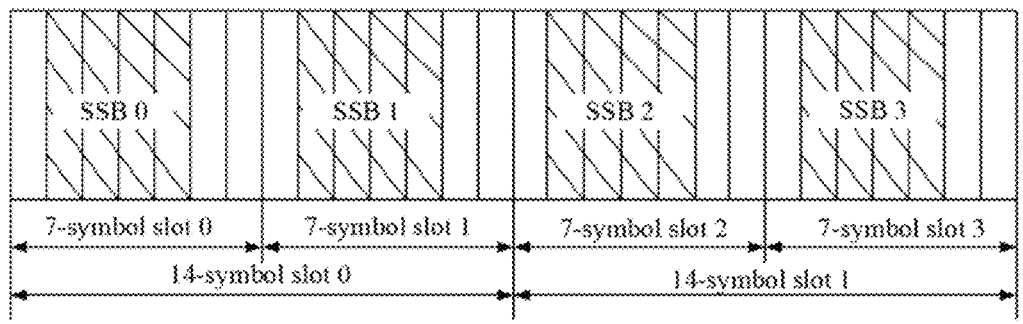
FIG. 1 is a schematic diagram of transmission of SSBs in the related art.
Figure 2:
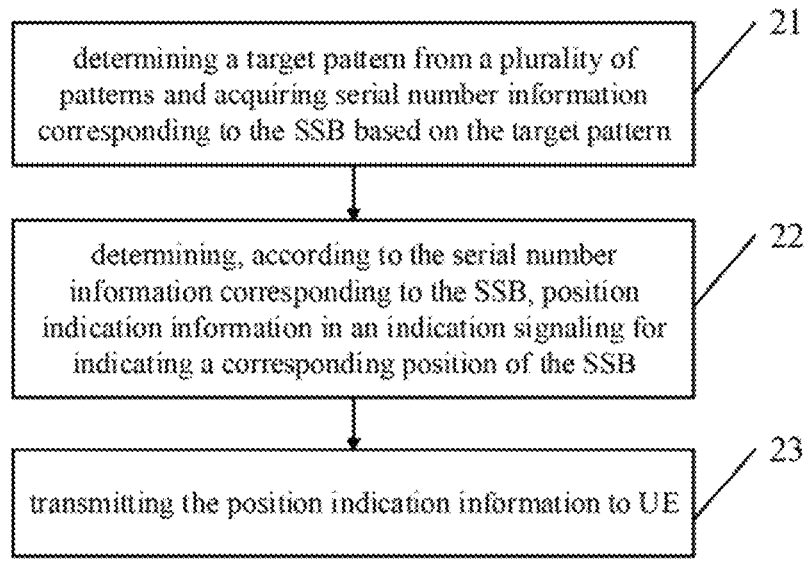
FIG. 2 is a schematic flow chart of a method of indicating an SSB according to some embodiments of the present disclosure.

In view of the problem in the related art that the determination and indication schemes for SSB cannot support a situation involving multiple patterns, the present disclosure provides a method of indicating an SSB, which is applicable to a base station side. As shown in FIG. 2, the indicating method includes following step 21 to step 23.

Step 21: determining a target pattern from a plurality of patterns and acquiring serial number information corresponding to the SSB based on the target pattern.

Step 22: determining, according to the serial number information corresponding to the SSB, position indication information in an indication signaling for indicating a corresponding position of the SSB.

Step 23: transmitting the position indication information to UE.

By determining a target pattern from a plurality of patterns and acquiring serial number information corresponding to the SSB based on the target pattern determining, according to the serial number information corresponding to the SSB, position indication information in an indication signaling for indicating a corresponding position of the SSB and transmitting the position indication information to a UE, the method of indicating an SSB provided by some embodiments of the present disclosure enables the UE to acquire the serial number information from the position indication information and determine the identifier of the pattern corresponding to SSB and the position of the SSB in the pattern, thereby resolving the synchronization signal correctly for a subsequent operation, and, as a result, solving the problem in the related art that the determination and indication schemes for SSB cannot support a situation involving multiple patterns.

The position indication information may be transmitted with six predetermined bits in the indication signaling.

Specifically, a step of determining, according to the serial number information corresponding to the SSB, the position indication information in the indication signaling for indicating the corresponding position of the SSB includes: determining the position indication information in the indication signaling for indicating the corresponding position of the SSB according to a position of the SSB in a pattern and an identifier of the pattern.

More specifically, a step of determining the position indication information in the indication signaling and for indicating the corresponding position of the SSB according to the position of the SSB in the pattern and the identifier of the pattern includes: determining a corresponding serial number of the SSB in the indication signaling according to a serial number of the SSB in the corresponding pattern and a serial number of the pattern.

The identifier of the pattern may be the serial number of the pattern, or may be other information capable of characterizing the identity of the pattern, which is not limited herein.

Optionally, a step of transmitting the position indication information to the UE includes: transmitting the position indication information to the UE by means of PBCH and DMRS.

In this embodiment, in order to reduce the occurrence of blind detection and improve processing efficiency, the step of transmitting the position indication information to the UE includes: mapping a part of the position indication information onto a predetermined DMRS sequence according to the identifier of the pattern and transmitting the DMRS sequence.

The part of the position indication information includes the serial number of a frequently used pattern, and the predetermined DMRS sequence may be an initially detected DMRS sequence.

Further, before determining, according to the serial number information corresponding to the SSB, the position indication information in the indication signaling for indicating the corresponding position of the SSB, the method further includes: establishing a mapping relationship between the plurality of patterns and position indication information in the indication signaling according to priority information of the plurality of patterns.

Optionally, in this embodiment, the mapping relationship may be configured in advance, which is not limited herein.

In this embodiment, for ease of usage, in the plurality of patterns, first SSBs always start from first symbols of respective slots, or always start from second symbols of respective slots, or some of the first SSBs start from first symbols of respective slots and the other of the first SSBs start from second symbols of respective slots.

The abovementioned solutions may be applicable to base stations operating at sub-6 GHz.

It can be seen from above, the foregoing solutions provided by some embodiments of the present disclosure solves the problem in the related art that the determination and indication schemes for SSB cannot support a situation involving multiple patterns.

Figure 3:
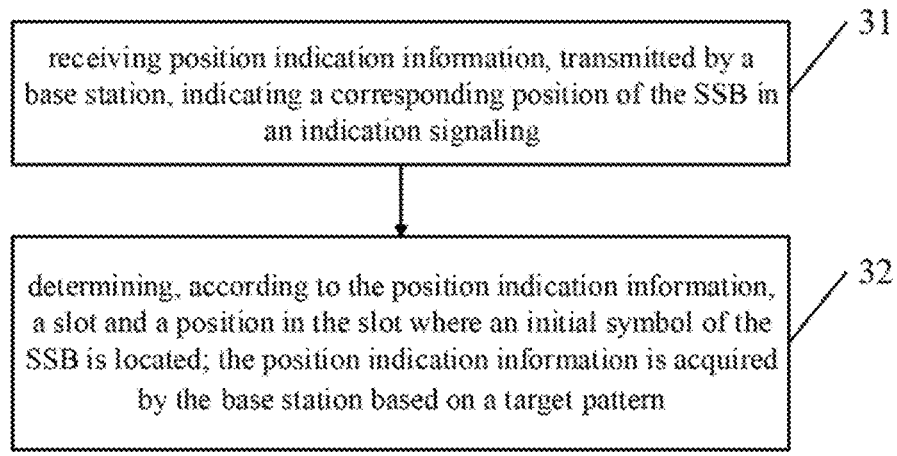
FIG. 3 is a schematic flow chart of a method of determining an SSB according to some embodiments of the present disclosure.

As shown in FIG. 3, some embodiments of the present disclosure further provide a method of determining an SSB, which is applicable to a UE side and includes following step 31 to step 32.

Step 31: receiving position indication information in an indication signaling for indicating a corresponding position of the SSB, and the position indication information being transmitted by a base station.

Step 32: determining, according to the position indication information, a slot and a position in the slot where an initial symbol of the SSB is located.

The position indication information is acquired by the base station based on a target pattern.

By receiving position indication information in an indication signaling for indicating a corresponding position of the SSB, and the position indication information being transmitted by a base station; and determining, according to the position indication information, a slot and a position in the slot where an initial symbol of the SSB is located, the method of determining an SSB provided by some embodiments of the present disclosure analyzes the synchronization signal correctly for a subsequent operation, and, as a result, solves the problem in the related art that the determination and indication schemes for SSB cannot support a situation involving multiple patterns.

Specifically, a step of determining, according to the position indication information, the slot and the position in the slot where the initial symbol of the SSB is located includes: determining serial number information corresponding to the SSB according to the position indication information; and determining the slot and the position in the slot where the initial symbol of the SSB is located according to the serial number information.

Optionally, a step of receiving position indication information in an indication signaling for indicating a corresponding position of the SSB, and the position indication information being transmitted by a base station includes: receiving position indication information, transmitted by the base station, indicating a corresponding position of the SSB in an indication signaling by means of a synchronization detection and a PBCH detection.

More specifically, a step of determining the serial number information corresponding to the SSB according to the position indication information includes: determining an identifier of a pattern corresponding to the SSB and a position of the SSB in the pattern according to the position indication information.

The identifier of the pattern may be the serial number of the pattern, or may be other information capable of characterizing the identity of the pattern, which is not limited herein.

Accordingly, a step of determining the slot and the position in the slot where the initial symbol of the SSB is located according to the serial number information includes: determining the slot and the position in the slot where the initial symbol of the SSB is located according to the identifier of the pattern corresponding to the SSB and the position of the SSB in the pattern.

To expedite the processing, a step of determining the identifier of the pattern corresponding to the SSB according to the position indication information includes: determining the identifier of the pattern corresponding to the SSB according to the position indication information and a mapping relationship between a pattern and position indication information for indicating a position in the indication signaling.

The mapping relationship may be configured in advance, which is not limited herein.

Optionally, the position indication information in the indication signaling for indicating the corresponding position of the SSB refers to a serial number of the SSB in the indication signaling, the identifier of the pattern corresponding to the SSB refers to a serial number of the pattern corresponding to the SSB, and the position of the SSB in the pattern refers to a serial number of the SSB in the pattern.

Specifically, a step of determining the identifier of the pattern corresponding to the SSB and the position of the SSB in the pattern according to the position indication information is implemented by using the following formula:

$$y=\lfloor x/a \rfloor;$$

$$z=\mod(x,a);$$

where y denotes the serial number of the pattern corresponding to the SSB, x denotes the serial number of the SSB in the indication signaling, z denotes the serial number of the SSB in the pattern, and a denotes the quantity of SSB in each synchronization period; and in case that the base station operates at a frequency from 0 GHz to 3 GHz, a is equal to 4, and in case that the base station operates at a frequency from 3 GHz to 6 GHz, a is equal to 8.

The abovementioned solutions may be applicable to UEs operating at a frequency smaller than 6 GHz.

It can be seen from above, the foregoing solutions provided by some embodiments of the present disclosure solve the problem in the related art that the determination and indication schemes for SSB cannot support a situation multiple patterns.

The method of indicating an SSB and the method of determining an SSB provided by some embodiments of the present disclosure are further described hereinafter.

The solution provided by some embodiments of the present disclosure is mainly directed to the configuration and indication of a synchronization signal pattern in a beam scanning mode.

When an NR system operates at sub-6 GHz, each slot may consist of 14 symbols or 7 symbols. In case that a slot consists of 14 symbols, which are symbol 0, symbol 1, symbol 2, . . . , symbol 13, the SSB may start from symbol 1 of the slot, as shown in FIG. 4a, or start from symbol 2, as shown in FIG. 4b.

The SSB pattern needs to be prescribed by a standard. When a system supports the configuration of multiple patterns, UE should be informed of information about patterns employed.

When an NR system operates at sub-3 GHz, there are 4 SSBs in each synchronization period; when an NR system operates at a frequency from 3 GHz to 6 GHz, there are 8 SSBs in each synchronization period; and when a system operates at a frequency over 6 GHz, there are 64 SSBs in each synchronization period. The maximum serial number of SSB is 64, and the system should be able to indicate 64 SSBs. The serial number of SSB is indicated by PBCH and DMRS.

In case that the serial number of SSB is indicated by PBCH, the SSB serial number information is partially or totally indicated by bit-mapping, which is called explicit indication. In case that the serial number of SSB is indicated by using DMRS, DMRS sequences corresponding to different SSB serial numbers are different from each other, if 8 DMRS sequences are used to indicate the SSB serial number, the 8 DMRS sequences require three bits of indicated information, which is called implicit indication. In NR, the explicit and implicit indication may jointly indicate 6 bits of information. Hereinafter, an SSB serial number indication capability of a system is 6-bit.

The following description is mainly directed to methods for indicating an SSB pattern and determining an SSB pattern, and the content carried by the indication signaling/reference signal with respect to SSB serial number.

When an NR system operates at sub-6 GHz, the NR system supports a slot of 14 symbols or a slot of 7 symbols. When the system employs the slot of 7 symbols, the symbol 0 is reserved for a downlink (DL) control symbol, the symbol 5 and symbol 6 are reserved for a gap and uplink (UL) transmission, in this way, only the middle 4 symbols may be used for SSB transmission. When the system employs the slot of 14 symbols, the system may reserve multiple symbols at an initial position of a slot for DL control, which may enhance the flexibility in scheduling of a self-contained subframe. The self-contained subframe is a frame structure proposed to reduce latency, and a detailed description thereof is omitted.

As such, there may be demand for different patterns in the NR system. For different patterns, symbols where synchronization signals are located are different. UE needs to know the symbol position at which each of the synchronization signals is detected, therefore the serial number of pattern should be informed to UE.

As described above, the system has a 6-bit indication capability for SSB serial numbers. When the system operates at a frequency front 3 GHz to 6 GHz, one synchronization period has only 8 SSBs, which requires only an indication capacity of 3 bits, as a result, the system has an additional available capacity of 3 bits; and when the system operates at a frequency from 0 GHz to 3 GHz, one synchronization period has only 4 SSBs, which requires only an indication capacity of 2 bits, as a result, the system has an additional available capacity of 4 bits. The solutions provided by some embodiments of the present disclosure mainly use the additional available capacity to indicate serial numbers of SSBs in the pattern.

For example, suppose a system is to support N patterns each having M blocks, the M SSBs of pattern 1 correspond to 0 to M−1 of the explicit and implicit SSB indication signaling, the M SSBs of pattern 2 correspond to M to 2M−1 of the explicit and implicit SSB indication signaling, and so on. If DMRS is used for the indication, a serial number of frequently used pattern is mapped to initially detected DMRS sequence to reduce the occurrence of blind detection.

The solution is illustrated as follows.

At the base station side, SSB is transmitted according to following operations.

(1) determining a serial number of each SSB in the indication signaling. The serial number of SSB in the indication signaling includes two portions: one is the SSB serial number of the SSB in a current period, and the other is the serial number of the pattern to which the SSB belongs.

When the system operates at a frequency from 3 GHz to 6 GHz, 8 SSBs of pattern 1 correspond to 0 to 7 of the explicit and implicit SSB indication signaling, and 8 SSBs of pattern 2 correspond to 8 to 15 of the explicit and implicit SSB indication signaling. In specific, pattern 1 is as shown in FIG. 5; and pattern 2 is as shown in FIG. 4b.

Optionally, when the system operates at a frequency from 3 GHz to 6 GHz, 8 SSBs of pattern 1 correspond to 0 to 7 of the explicit and implicit SSB indication signaling, 8 SSBs of pattern 2 correspond to 8 to 15 of the explicit and implicit SSB indication signaling, . . . , and 8 SSBs of pattern N correspond to 8N−8 to 8N−1 of the explicit and implicit SSB indication signaling, where N>2.

Optionally, when the system operates at a frequency from 0 GHz to 3 GHz, 4 SSBs of pattern 1 correspond to 0 to 3 of the explicit and implicit SSB indication signaling, 4 SSBs of pattern 2 correspond to 4 to 7 of the explicit and implicit SSB indication signaling, . . . , and 4 SSBs of pattern N correspond to 4N−4 to 4N−1 of the explicit and implicit SSB indication signaling, where N>=2.

(2) transmitting the serial number of SSB in the indication signaling by means of PBCH and DMRS.

At the UE side, SSB is detected according to following operations.

(1) receiving, by the UE, signals transmitted by the base station, and performing a synchronization detection and a PBCH detection.

(2) determining, by the UE, the pattern serial number of SSB and the SSB serial number of the SSB in a current synchronization signal period according to the serial number of SSB in the indication signaling derived from the PBCH detection.

If the serial number of SSB in the indication signaling that is detected by UE is x, when the UE operates at sub-3 GHz, the pattern serial number of SSB is $\lfloor x/4 \rfloor$, and the serial number of SSB is mod(x, 4); and when the UE operates at a frequency from 3 GHz to 6 GHz, the pattern serial number of SSB is ⌊x/8⌋, and the serial number of SSB is mod(x, 8).

(3) determining the serial numbers of the slot and the symbol in the slot where an initial symbol of the SSB is located according to the pattern serial number of SSB and the SSB serial number of the SSB in the current synchronization signal period.

If the pattern serial number of SSB is y, the serial number of SSB is x, then the location of an initial symbol of the z-th SSB in the y-th pattern is a desired value (absolute position of SSB).

In the solution provided by some embodiments of the present disclosure, an SSB pattern is indicated by using existing bits in the system, thereby enhancing the flexibility of system without incurring additional overhead.

As shown in FIG. 6, some embodiments of the present disclosure further provide a method of indicating an SSB. The method is applicable to a base station side and includes step 61 and step 62.

Step 61: determining, according to an SSB serial number of the SSB in a current period and slot structure information corresponding to the SSB, position indication information in an indication signaling for indicating a corresponding position of the SSB.

Step 62: transmitting the position indication information to a user equipment.

By determining, according to an SSB serial number of the SSB in a current period and slot structure information corresponding to the SSB, position indication information in an indication signaling for indicating a corresponding position of the SSB, and transmitting the position indication information to UE, the method of indicating an SSB provided by some embodiments of the present disclosure achieves the objective of utilizing the surplus bits of the indication signaling of SSB serial number to indicate frame structure information of the system, such that the UE may be provided with the frame structure information without adding a signaling specialized in indicating the frame structure, thereby conserving resources.

Optionally, a step of transmitting the position indication information to UE includes: transmitting the position indication information to the UE by means of PBCH and DMRS.

Specifically, the slot structure information indicates that a slot structure currently used by a base station is a 7-symbol slot structure or a 14-symbol slot structure.

Further, before determining, according to an SSB serial number of the SSB in a current period and slot structure information corresponding to the SSB, position indication information in an indication signaling for indicating a corresponding position of the SSB, the method further includes: establishing a mapping relationship between slot structures and position indication information for indicating a position in the indication signaling.

The mapping relationship may be configured in advance, which is not limited herein.

The abovementioned solution may be applicable to a base station operating at sub-6 GHz.

It can be seen from above, the solution provided by some embodiments of the present disclosure effectively solves the problem of a waste of resources caused by that a specialized signaling is needed to indicate a system frame structure.

Figure 7:
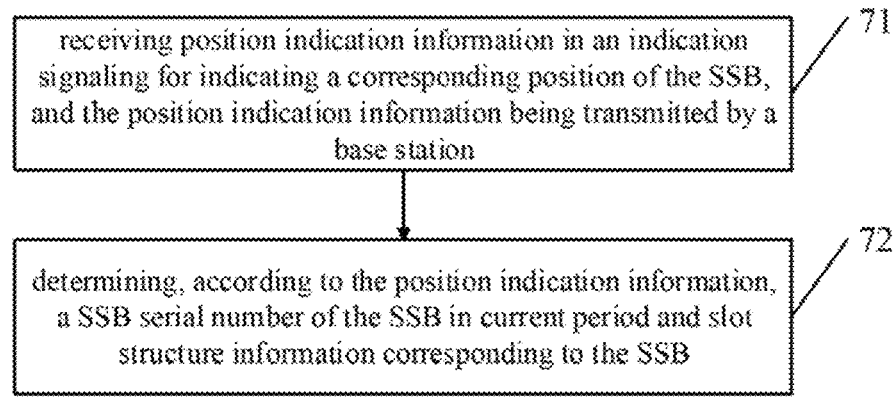
FIG. 7 is a schematic flow chart of a method of determining an SSB according to some embodiments of the present disclosure.

As shown in FIG. 7, some embodiments of the present disclosure further provide a method of determining an SSB. The determining method may be applicable to a UE side and includes step 71 and step 72.

Step 71: receiving position indication information in an indication signaling for indicating a corresponding position of the SSB, and the position indication information being transmitted by a base station.

Step 72: determining, according to the position indication information, an SSB serial number of the SSB in a current period and slot structure information corresponding to the SSB.

By receiving position indication information in an indication signaling, transmitted by a base station, indicating a corresponding position of the SSB; and determining, according to the position indication information, an SSB serial number of the SSB in a current period and slot structure information corresponding to the SSB, the method of determining an SSB provided by some embodiments of the present disclosure is capable of acquiring the SSB serial number of the SSB in a current period and the slot structure information corresponding to the SSB simultaneously without acquiring the frame structure information by means of a specialized signaling, thus achieving the objective of utilizing the surplus bits of the indication signaling of SSB serial number to indicate frame structure information of the system and thereby conserving resources.

Optionally, a step of receiving position indication information in an indication signaling for indicating a corresponding position of the SSB, and the position indication information being transmitted by a base station includes: receiving position indication information, transmitted by the base station, indicating a corresponding position of the SSB in an indication signaling by means of a synchronization detection and a PBCH detection.

Specifically, a step of determining, according to the position indication information, slot structure information corresponding to the SSB includes: determining the slot structure information corresponding to the SSB according to the position indication information and a mapping relationship between a slot structure and position indication information for indicating a position in the indication signaling.

Further, before determining the slot structure information corresponding to the SSB, the method further includes: configuring the mapping relationship in advance.

Optionally, the position indication information in the indication signaling for indicating the corresponding position of the SSB includes a serial number of the SSB in the indication signaling, and the slot structure information corresponding to the SSB indicates that a slot structure currently used by the base station is a 7-symbol slot structure or a 14-symbol slot structure.

Accordingly, a step of determining, according to the position indication information, the SSB serial number of the SSB in a current period and the slot structure information corresponding to the SSB is implemented by using following formula:

$$y=\lfloor x/a \rfloor;$$

$$z=\mathrm{mod}(x,a);$$

where y denotes an indicated value of the slot structure information, x denotes the serial number of the SSB in the indication signaling, z denotes the SSB serial number of the SSB in the current period, and a denotes the quantity of SSBs in each synchronization period;

in case that the base station operates at a frequency from 0 GHz to 3 GHz, a is equal to 4, and in case that the base station operates at a frequency from 3 GHz to 6 GHz, a is equal to 8; and y being equal to 0 represents that the slot structure currently used by the base station is a 14-symbol slot structure; and y being equal to 1 represents that the slot structure currently used by the base station is a 7-symbol slot structure.

The abovementioned solution is applicable to UE operating at sub-6 GHz.

It can be seen from above, the solutions provided by some embodiments of the present disclosure effectively solve the problem of resource waste caused by that a specialized signaling is needed to indicate a system frame structure.

A second method of indicating an SSB applicable to a base station side and a second method of determining an SSB applicable to a UE side provided by some embodiments of the present disclosure are described in detail hereinafter.

A specific example is given below.

At the base station side, SSB is transmitted according to following operations.

(1) determining a serial number of each SSB in the indication signaling. Herein, the serial number of SSB in the indication signaling includes two portions: one is the SSB serial number of the SSB in a current period, and the other is the system slot structure is 7-symbol slot or 14-symbol slot.

When the system operates at a frequency from 3 GHz to 6 GHz, it may be the case that 8 SSBs of a 14-symbol slot structure correspond to 0 to 7 of the explicit and implicit SSB indication signaling, and 8 SSBs of a 7-symbol slot structure correspond to 8 to 15 of the explicit and implicit SSB indication signaling.

When the system operates at a frequency from 0 GHz to 3 GHz, it may be the case that 4 SSBs of a 14-symbol slot structure correspond to 0 to 3 of the explicit and implicit SSB indication signaling, and 4 SSBs of a 7-symbol slot structure correspond to 4 to 7 of the explicit and implicit SSB indication signaling.

(2) transmitting the serial number of SSB in the indication signaling by means of PBCH and DMRS.

At the UE side, SSB is detected according to following operations.

(1) receiving, by the UE, signals transmitted by the base station, and performing a synchronization detection and a PBCH detection.

(2) determining, by the UE, the serial number of slot structure and the SSB serial number of the SSB in current synchronization signal period according to the serial number of SSB in the indication signaling derived from the PBCH detection.

It is assumed that the serial number of SSB in the indication signaling that is detected by UE is x, when the UE operates at sub-3 GHz, if $\lfloor x/4 \rfloor=0$, the system employs a 14-symbol slot structure, if $\lfloor x/4 \rfloor=1$, the system employs a 7-symbol slot structure, and the serial number of SSB is mod (x, 4); and when the UE operates at a frequency from 3 GHz to 6 GHz, if $\lfloor x/8 \rfloor=0$, the system employs a 14-symbol slot structure, if $\lfloor x/8 \rfloor 1$, the system employs a 7-symbol slot structure, and the serial number of SSB is mod(x, 8).

It can be seen that, by utilizing the surplus bits of the indication signaling SSB serial number to indicate frame structure information of the system, the solution provided by some embodiments of the present disclosure dispenses with the need for an additional specialized signaling to indicate frame structure, thereby conserving resources.

Figure 8:
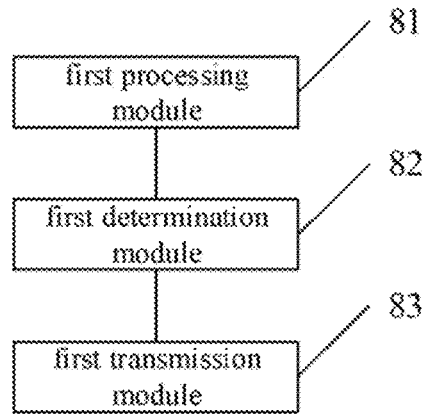
FIG. 8 is a schematic structural diagram of an apparatus of indicating an SSB according to some embodiments of the present disclosure.

As shown in FIG. 8, some embodiments of the present disclosure further provide an apparatus of indicating an SSB. The apparatus may be applied to a base station side and include: a first processing module 81, configured to determine a target pattern from a plurality of patterns and acquire serial number information corresponding to the SSB based on the target pattern; a first determination module 82, configured to determine, according to the serial number information corresponding to the SSB, position indication information in an indication signaling for indicating a corresponding position of the SSB; and a first transmission module 83, configured to transmit the position indication information to UE.

By determining a target pattern from a plurality of patterns and acquiring serial number information corresponding to the SSB based on the target pattern, determining, according to the serial number information corresponding to the SSB, position indication information in an indication signaling for indicating a corresponding position of the SSB and transmitting the position indication information to UE, the apparatus of indicating an SSB provided by some embodiments of the present disclosure enables UE to acquire the serial number information from the position indication information and determine the identifier of the pattern corresponding to the SSB and the position of the SSB in the pattern, thereby resolving the synchronization signal correctly for a subsequent operation, and, as a result, solving the problem in the related art that the determination and indication schemes for SSB cannot support a situation involving multiple patterns.

Specifically, the first determination module includes: a first determination sub-module, configured to determine the position indication information in the indication signaling for indicating the corresponding position of the SSB according to a position of the SSB in a pattern and an identifier of the pattern.

More specifically, the first determination sub-module includes: a first determination unit, configured to determine a corresponding serial number of the SSB in the indication signaling according to a serial number of the SSB in the pattern and a serial number of the pattern.

In order to reduce the number of occurrences of blind detection and improve processing efficiency, in this embodiment, the first transmission module includes: a first transmission sub-module, configured to map a part of the position indication information onto a predetermined DMRS sequence according to the identifier of the pattern and transmit the DMRS sequence.

Further, the apparatus further includes: a first establishment module, configured to, before the position indication information in the indication signaling for indicating the corresponding position of the SSB is determined according to the serial number information corresponding to the SSB, establish a mapping relationship between the plurality of patterns and position indication information in the indication signaling according to priority information of the plurality of patterns.

In this embodiment, for ease of usage, in the plurality of patterns, first SSBs always start from first symbols of respective slots, or always start from second symbols of respective slots, or some of the first SSBs start from first symbols of respective slots and the other of the first SSBs start from second symbols of respective slots.

The abovementioned solution may be applied to a base station operating at sub-6 GHz.

The embodiments of the first method of indicating an SSB applied to a base station side are all applicable to the embodiments of the apparatus of indicating an SSB and may achieve the same technical effects.

It can be seen from above, the foregoing solution provided by some embodiments of the present disclosure solves the problem in the related art that the determination and indication schemes for SSB cannot support a situation involving multiple patterns.

Some embodiments of the present disclosure further provide a base station, including: a storage, a processor and a computer program stored on the storage and executable by the processor, where when executing the program, the processor is configured to perform following steps: determining, a target pattern from a plurality of patterns and acquiring serial number information corresponding to the SSB based on the target pattern; determining, according to the serial number information corresponding to the SSB, position indication information in an indication signaling for indicating a corresponding position of the SSB; and transmitting the position indication information to UE by means of a transceiver.

By determining a target pattern from a plurality of patterns and acquiring serial number information corresponding to the SSB based on the target pattern, determining, according, to the serial number information corresponding to the SSB, position indication information in an indication signaling for indicating a corresponding position of the SSB and transmitting the position indication in to UE, the base station provided by some embodiments of the present disclosure enables UE to acquire the serial number information from the position indication information and determine the identifier of the pattern corresponding to the SSB and the position of the SSB in the pattern, thereby resolving the synchronization signal correctly for a subsequent operation, and, as a result, solving the problem in the related art that the determination and indication schemes for SSB cannot support a situation involving multiple patterns.

Figure 9:
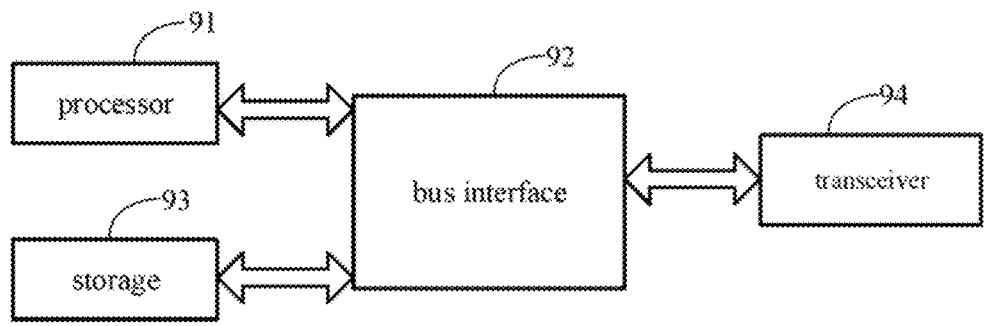
FIG. 9 is a schematic structural diagram of a base station according to some embodiments of the present disclosure.

As shown specifically in FIG. 9, the base station provided by some embodiments of the present disclosure includes: a processor 91, and a storage 93 connected to the processor 91 via a bus interface 92, the storage 93 is configured to store program and data used by the processor 91 in operation, the processor 91 is configured to call and execute the program and data stored in the storage 93 to implement the following process: determining a target pattern from a plurality of patterns and acquiring serial number information corresponding to the SSB based on the target pattern; and transmitting the position indication information to UE by means of a transceiver 94.

The transceiver 94 is connected to the bus interface 92 and configured to receive and transmit data under the control of the processor 91.

It is noted, in FIG. 9, a bus architecture may include any quantity of interconnected buses and bridges, such that various circuits including one or more processors represented by the processor 91 and storages represented by the storage 93 are connected to each other. The bus architecture may also connect various other circuits such as peripherals, voltage regulators and power management circuits, which is well known in the art. Therefore, a detailed description thereof is omitted herein. Bus interface provides an interface. The transceiver 94 may include multiple elements, such as a receiver and a transmitter, to allow for communication with various other apparatuses on the transmission medium. The processor 91 is responsible for supervising the bus architecture and normal operation and the storage 93 may store the data currently used by the processor 91 during operation.

It is to be appreciated by a person skilled in the art, all or a part of steps of the foregoing embodiments may be implemented by hardware, or implemented by associated hardware under the control of a computer program. The computer program includes instructions configured to perform a part or all of the steps of the foregoing method, and may be stored in a readable storage medium, which may be any form of storage medium, such as a volatile or non-volatile computer readable storage medium, a transient or non-transient computer readable storage medium.

Specifically, the processor is configured to: determine the position indication information in the indication signaling for indicating the corresponding position of the SSB according to a position of the SSB in a pattern and an identifier of the pattern.

More specifically, the processor is configured to: determine a corresponding serial number of the SSB in the indication signaling according to a serial number of the SSB in the pattern and a serial number of the pattern.

Optionally, the processor is configured to: transmit the position indication information to the UE by means of PBCH and DMRS.

In this embodiment, in order to reduce the occurrence of blind detection and improve processing efficiency, the processor is configured to: map a part of the position indication information onto a predetermined DMRS sequence according to the identifier of the pattern and transmit the DMRS sequence.

Further, the processor is configured to: before determining, according to the serial number information corresponding to the SSB, the position indication information in the indication signaling for indicating the corresponding position of the SSB, establish a mapping relationship between the plurality of patterns and position indication information in the indication signaling according to priority information of the plurality of patterns.

In this embodiment, for ease of usage, in the plurality of patterns, first SSBs always start from first symbols of respective slots, or always start from second symbols of respective slots, or some of the first SSBs start from first symbols of respective slots and the other of the first SSBs start from second symbols of respective slots.

The foregoing base station may be a base station operating at sub-6 GHz.

The embodiments of the first method of indicating an SSB applied to a base station side are all applicable to the embodiments of the base station and may achieve the same technical effects.

It can be seen from above, the foregoing solution provided by some embodiments of the present disclosure solves the problem in the related art that the determination and indication schemes for SSB cannot support a situation involving multiple patterns.

Some embodiments of the present disclosure further provide a computer readable storage medium storing thereon a computer program, where the computer program is configured to be executed by a processor to implement following steps: determining a target pattern from a plurality of patterns and acquiring serial number information corresponding to the SSB based on the target pattern; determining, according to the serial number information corresponding to the SSB, position indication information indicating a corresponding position of the SSB in an indication signaling; transmitting the position indication information to UE.

By determining a target pattern from a plurality of patterns and acquiring serial number information corresponding to the SSB based on the target pattern, determining, according to the serial number information corresponding to the SSB, position indication information in an indication signaling for indicating a corresponding position of the SSB and transmitting the position indication information to UE, the computer readable storage medium provided by some embodiments of the present disclosure enables UE to acquire the serial number information from the position indication information and determine the identifier of the pattern corresponding to the SSB and the position of the SSB in the pattern, thereby resolving the synchronization signal correctly for a subsequent operation, and, as a result, solving the problem in the related art that the determination and indication schemes for SSB cannot support a situation involving multiple patterns.

Specifically, determining, according to the serial number information corresponding to the SSB, the position indication information in the indication signaling for indicating the corresponding position of the SSB includes: determining the position indication information in the indication signaling for indicating the corresponding position of the SSB according to a position of the SSB in a pattern and an identifier of the pattern.

More specifically, determining the position indication information in the indication signaling for indicating the corresponding position of the SSB according to the position of the SSB in the pattern and the identifier of the pattern includes: determining a corresponding serial number of the SSB in the indication signaling according to a serial number of the SSB in the pattern and a serial number of the pattern.

Optionally, a step of transmitting the position indication information to the UE includes: transmitting the position indication information to the UE by means of PBCH and DMRS.

In this embodiment, in order to reduce the occurrence of blind detection and improve processing efficiency, the step of transmitting the position indication information to the UE includes: mapping a part of the position indication information onto a predetermined DMRS sequence according to the identifier of the pattern and transmitting the DMRS sequence.

Further, the computer program is configured to be executed by a processor to implement following step: before determining, according to the serial number information corresponding to the SSB, the position indication information in the indication signaling for indicating the corresponding position of the SSB, establishing a mapping relationship between the plurality of patterns and position indication information in the indication signaling according to priority information of the plurality of patterns.

In this embodiment, for ease of usage, in the plurality of patterns, first SSBs always start from first symbols of respective slots, or always start from second symbols of respective slots, or some of the first SSBs start from first symbols of respective slots and the other start from second symbols of respective slots.

The abovementioned solution is applicable to a base station operating at sub-6 GHz.

The embodiments of the first method of indicating an SSB applied to a base station side are all applicable to the embodiments of the computer readable storage medium and may achieve the same technical effects.

It can be seen from above, the foregoing solution provided by some embodiments of the present disclosure solves the problem in the related art that the determination and indication schemes for SSB cannot support a situation involving multiple patterns.

Figure 10:
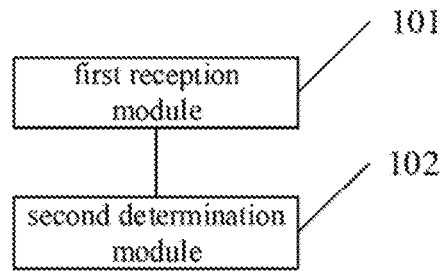
FIG. 10 is a schematic structural diagram of an apparatus of determining an SSB according to some embodiments of the present disclosure.

As shown in FIG. 10, some embodiments of the present disclosure further provide an apparatus of determining an SSB. The apparatus is applicable to a UE side and includes: a first reception module 101, configured to receive position indication information in an indication signaling for indicating a corresponding position of the SSB, and the position indication information being transmitted by a base station; and a second determination module 102, configured to determine, according to the position indication information, a slot and a position in the slot where an initial symbol of the SSB is located; where the position indication information is acquired by the base station based on a target pattern.

By receiving position indication information in an indication signaling for indicating a corresponding position of the SSB, and the position indication information being transmitted by a base station; and determining, according to the position indication information, a slot and a position in the slot where an initial symbol of the SSB is located, the apparatus of determining an SSB provided by some embodiments of the present disclosure resolves the synchronization signal correctly for a subsequent operation, and, as a result, solves the problem in the related art that the determination and indication schemes for SSB cannot support a situation involving multiple patterns.

Specifically, the second determination module includes: a second determination sub-module, configured to determine serial number information corresponding to the SSB according to the position indication information; and a third determination sub-module, configured to determine the slot and the position in the slot where the initial symbol of the SSB is located according to the serial number information.

More specifically, the second determination sub-module includes: a second determination unit, configured to determine an identifier of a pattern corresponding to the SSB and a position of the SSB in the pattern according to the position indication information.

Accordingly, the third determination sub-module includes: a third determination unit, configured to determine the slot and the position in the slot where the initial symbol of the SSB is located according to the identifier of the pattern corresponding to the SSB and the position of the SSB in the pattern.

Optionally, the position indication information in the indication signaling for indicating the corresponding position of the SSB includes a serial number of the SSB in the indication signaling, the identifier of the pattern corresponding to the SSB includes a serial number of the pattern corresponding to the SSB, and the position of the SSB in the pattern includes a serial number of the SSB in the pattern.

Specifically, the second determination unit performs operation by using following formula:

$$y = \lfloor x/a \rfloor;$$

$$z = \mathrm{mod}(x, a);$$

where y denotes the serial number of the pattern corresponding to the SSB, x denotes the serial number of the SSB in the indication signaling, z denotes the serial number of the SSB in the pattern, and a denotes the quantity of SSBs in each synchronization period; and in case that the base station operates at a frequency from 0 GHz to 3 GHz, a is equal to 4, and in case that the base station operates at a frequency from 3 GHz to 6 GHz, a is equal to 8.

The abovementioned solution is applicable to UE operating at sub-6 GHz.

The embodiments of the first method of determining an SSB applied to a UE side are all applicable to the embodiments of the apparatus of determining an SSB and may achieve the same technical effects.

It can be seen from above, the foregoing solution provided by some embodiments of the present disclosure solves the problem in the related art that the determination and indication schemes for SSB cannot support a situation involving multiple patterns.

Some embodiments of the present disclosure further provide UE, including: a storage, a processor and a computer program stored on the storage and executable by the processor, where when executing the program, the processor is configured to perform following steps: receiving, by a transceiver, position indication information in an indication signaling for indicating a corresponding position of the SSB, and the position indication information being transmitted by a base station; and determining, according to the position indication information, a slot and a position in the slot where an initial symbol of the SSB is located; where the position indication information is acquired by the base station based on a target pattern.

By receiving position indication information in an indication signaling for indicating a corresponding position of the SSB, and the position indication information being transmitted by a base station; and determining, according to the position indication information, a slot and a position in the slot where an initial symbol of the SSB is located, the UE provided by some embodiments of the present disclosure resolves the synchronization signal correctly for a subsequent operation, and, as a result, solves the problem in the related art that the determination and indication schemes for SSB cannot support a situation involving multiple patterns.

Figure 11:
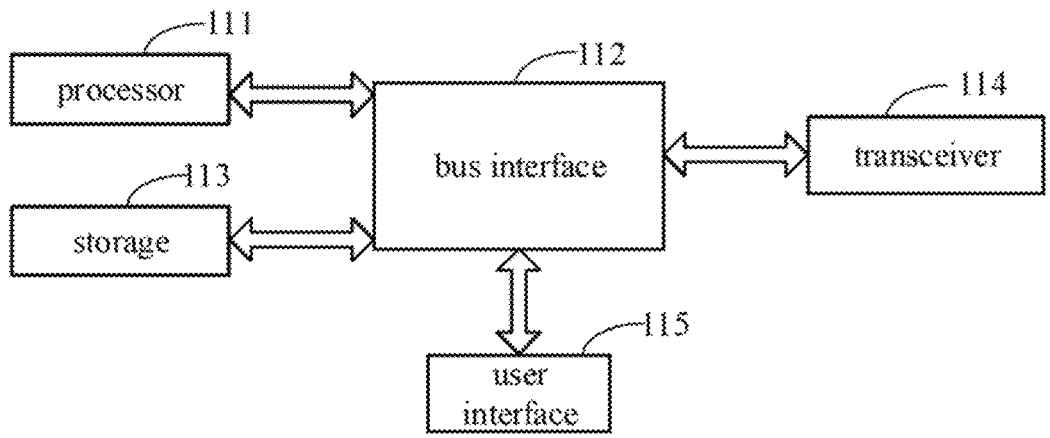
FIG. 11 is a schematic structural diagram of UE according to some embodiments of the present disclosure.

As shown specifically in FIG. 11, the UE provided by some embodiments of the present disclosure includes: a processor 111, and a storage 113 connected to the processor 111 via a bus interface 112, the storage 113 is configured to store program and data used by the processor 111 in operation, the processor 111 is configured to call and execute the program and data stored in the storage 113 to implement the following process: receiving, by a transceiver 114, position indication information in an indication signaling for indicating a corresponding position of the SSB, and the position indication information being transmitted by a base station; and determining, according to the position indication information, a slot and a position in the slot where an initial symbol of the SSB is located.

The transceiver 114 is connected to the bus interface 112 and configured to receive and transmit data under the control of the processor 111.

It is noted, in FIG. 11, a bus architecture may include any quantity of interconnected buses and bridges, such that various circuits including one or more processors represented by the processor 111 and storages represented by the storage 113 are connected to each other. The bus architecture may also connect various other circuits such as peripherals, voltage regulators and power management circuits, which is well known in the art. Therefore, a detailed description thereof is omitted herein. Bus interface provides an interface. The transceiver 114 may include multiple elements, such as a receiver and a transmitter, to allow for communication with various other apparatuses on the transmission medium. For different UE, user interface 115 may be an interface configured to connect to a requisite device externally or internally, and the connected device includes, but not limited to: a keypad, display, speaker, microphone, joystick, etc. The processor 111 is responsible for supervising the bus architecture and normal operation and the storage 113 may store the data currently used by the processor 111 during operation.

It is to be appreciated by a person skilled in the art, all or a part of steps of the foregoing, embodiments may be implemented by hardware, or implemented by associated hardware under the control of a computer program. The computer program includes instructions configured to perform a part or all of the steps of the foregoing method, and may be stored in a readable storage medium, which may be any firm of storage medium, such as a volatile or non-volatile computer readable storage medium, a transient or non-transient computer readable storage medium.

Specifically, the processor is configured to: determine serial number information corresponding to the SSB according to the position indication information: and determine the slot and the position in the slot where the initial symbol of the SSB is located according to the serial number information.

Optionally, the processor is specifically configured to: receive position indication information in an indication signaling, transmitted by the base station, indicating a corresponding position of the SSB by means of a synchronization detection and a PBCH detection.

More specifically, the processor is specifically configured to: determine an identifier of a pattern corresponding to the SSB and a position of the SSB the pattern according to the position indication information.

Accordingly, the processor is specifically configured to: determine the slot and the position in the slot where the initial symbol of the SSB is located according to the identifier of the pattern corresponding to the SSB and the position of the SSB in the pattern.

To expedite the processing, the processor is specifically configured to: determine the identifier of the pattern corresponding to the SSB according to the position indication information and a mapping relationship between a pattern and position indication information for indicating a position in the indication signaling.

Optionally, the position indication information in the indication signaling for indicating the corresponding position of the SSB includes a serial number of the SSB in the indication signaling, the identifier of the pattern corresponding to the SSB includes a serial number of the pattern corresponding to the SSB, and the position of the SSB in the pattern includes a serial number of the SSB in the pattern.

Specifically, the processor is configured to determine the identifier of the pattern corresponding, to the SSB and the position of the SSB in the pattern according to the position indication information by using following formula:

$$y=\lfloor x/a \rfloor;$$

$$z=\mathrm{mod}(x,a);$$

where y denotes the serial number of the pattern corresponding to the SSB, x denotes the serial number of the SSB in the indication signaling, z denotes the serial number of the SSB in the pattern, and a denotes the quantity of SSBs in each synchronization period; and in case that the base station operates at a frequency from 0 GHz to 3 GHz, a is equal to 4, and in case that the base station operates at a frequency from 3 GHz to 6 GHz, a is equal to 8.

The abovementioned UE may be UE operating at sub-6 GHz.

The embodiments of the first method of determining an SSB applied to a UE side are all applicable to the embodiments of the UE and may achieve the same technical effects.

It can be seen from above, the foregoing solution provided by some embodiments of the present disclosure solves the problem in the related art that the determination and indication schemes for SSB cannot support a situation involving multiple patterns.

Some embodiments of the present disclosure thriller provide a computer readable storage medium storing thereon a computer program, where the computer program is configured to be executed by a processor to implement following steps: receiving position indication information in an indication signaling, transmitted by a base station, indicating a corresponding position of the SSB; determining, according to the position indication information, a slot and a position in the slot where an initial symbol of the SSB is located. The position indication information is acquired by the base station based on a target pattern.

By receiving position indication information in an indication signaling, transmitted by a base station, indicating a corresponding position of the SSB; and determining, according to the position indication information, a slot and a position in the slot where an initial symbol of the SSB is located, the computer readable storage medium provided by some embodiments of the present disclosure resolves the synchronization signal correctly for a subsequent operation, and, as a result, solves the problem in the related art that the determination and indication schemes for SSB cannot support a situation involving multiple patterns.

Specifically, a step of determining, according to the position indication information, the slot and the position in the slot where the initial symbol of the SSB is located includes: determining serial number information corresponding to the SSB according to the position indication information; and determining the slot and the position in the slot where the initial symbol of the SSB is located according to the serial number information.

Optionally, a step of receiving position indication information in an indication signaling, transmitted by the base station, indicating a corresponding position of the SSB includes: receiving position indication information, transmitted by the base station, indicating a corresponding position of the SSB in an indication signaling by means of a synchronization detection and a PBCH detection.

More specifically, a step of determining the serial number information corresponding to the SSB according to the position indication information includes; determining an identifier of a pattern corresponding to the SSB and a position of the SSB in the pattern according to the position indication information.

Accordingly, a step of determining the slot and the position in the slot where the initial symbol of the SSB is located according to the serial number information includes: determining the slot and the position in the slot where the initial symbol of the SSB is located according to the identifier of the pattern corresponding to the SSB and the position of the SSB in the pattern.

To expedite the processing, determining the identifier of the pattern corresponding to the SSB according to the position indication information includes: determining the identifier of the pattern corresponding to the SSB according to the position indication information and a mapping relationship between a pattern and position indication information for indicating a position in the indication signaling.

Optionally, the position indication information in the indication signaling for indicating the corresponding position of the SSB includes a serial number of the SSB in the indication signaling, the identifier of the pattern corresponding to the SSB includes a serial number of the pattern corresponding to the SSB, and the position of the SSB in the pattern comprises a serial number of the SSB in the pattern.

Specifically, a step of determining the identifier of the pattern corresponding to the SSB and the position of the SSB in the pattern according to the position indication information is implemented by using following formula:

$$y=\lfloor x/a \rfloor;$$

$$z=\mathrm{mod}(x,a);$$

where y denotes the serial number of the pattern corresponding to the SSB, x denotes the serial number of the SSB in the indication signaling, z denotes the serial number of the SSB in the pattern, a denotes the quantity of SSBs in each synchronization period; in case that the base station operates at a frequency from 0 GHz to 3 GHz, a is equal to 4, and in case that the base station operates at a frequency from 3 GHz to 6 GHz, a is equal to 8.

The abovementioned solution is applicable to UE operating at sub-6 GHz.

The embodiments of the first method of determining an SSB applied to a UE side are all applicable to the embodiments of the computer readable storage medium and may achieve the same technical effects.

It can be seen from above, the foregoing solution provided by some embodiments of the present disclosure solves the problem in the related art that the determination and indication schemes for SSB cannot support a situation involving multiple patterns.

Figure 12:
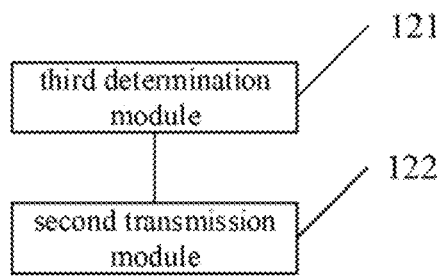
FIG. 12 is a schematic structural diagram of an apparatus of indicating an SSB according to some embodiments of the present disclosure.

As shown in FIG. 12, some embodiments of the present disclosure further provide an apparatus of indicating an SSB. The apparatus is applicable to a base station side and includes: a third determination module 121, configured to determine, according to an SSB serial number of the SSB in a current period and slot structure information corresponding to the SSB, position indication information in an indication signaling for indicating a corresponding position of the SSB; and a second transmission module 122, configured to transmit the position indication information to UE.

By determining, according to an SSB serial number of the SSB in a current period and slot structure information corresponding to the SSB position indication information in an indication signaling for indicating a corresponding position of the SSB and transmitting the position indication information to UE, the apparatus of indicating an SSB provided by some embodiments of the present disclosure achieves the objective of utilizing the surplus bits of the indication signaling of SSB serial number to indicate frame structure information of the system, such that the UE may be provided with the frame structure information without adding a signaling specialized in indicating the frame structure thereby conserving resources.

Specifically, the slot structure information indicates that a slot structure currently used by a base station is a 7-symbol slot structure or a 14-symbol slot structure.

The abovementioned solution is applicable to a base station operating at sub-6 GHz.

The embodiments of the second method of indicating an SSB applied to a base station side are all applicable to the embodiments of the apparatus of indicating an SSB and may achieve the same technical effects.

It can be seen from above, the solution provided by some embodiments of the present disclosure solves the problem that a specialized signaling is needed to indicate system frame structure, thereby wasting resources.

Some embodiments of the present disclosure further provide a base station, including: a storage, a processor and a computer program stored on the storage and executable by the processor, where when executing the program, the processor is configured to perform following steps: determining, according to an SSB serial number of the SSB in a current period and slot structure information corresponding to the SSB, position indication information in an indication signaling for indicating a corresponding position of the SSB; and transmitting the position indication information to UE by means of a transceiver.

By determining, according to an SSB serial number of the SSB in a current period and slot structure information corresponding to the SSB, position indication information in an indication signaling for indicating a corresponding position of the SSB and transmitting the position indication information to UE, the base station provided by some embodiments of the present disclosure achieves the objective of utilizing the surplus bits of the indication signaling of SSB serial number to indicate frame structure information of the system, such that the UE may be provided with the frame structure information without adding a signaling specialized in indicating the frame structure, thereby conserving resources.

Figure 13:
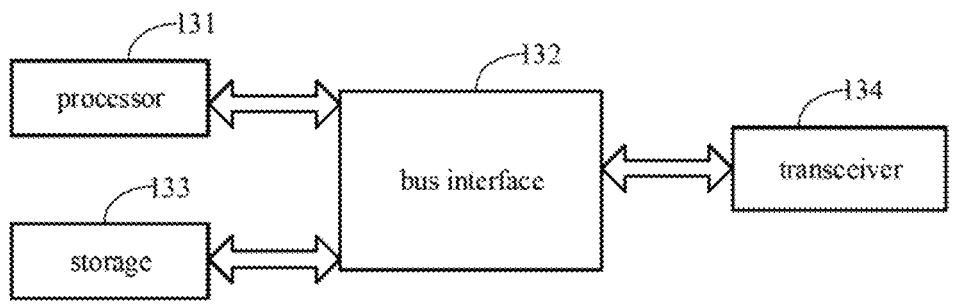
FIG. 13 is a schematic structural diagram of a base station according to some embodiments of the present disclosure.

As shown specifically in FIG. 13, the base station provided by some embodiments of the present disclosure includes: a processor 131, and a storage 133 connected to the processor 131 via a bus interface 132, the storage 133 is configured to store program and data used by the processor 131 in operation, the processor 131 is configured to call and execute the program and data stored in the storage 133 to implement the following process: determining, according to an SSB serial number of the SSB in a current period and slot structure information corresponding to the SSB, position indication information in an indication signaling for indicating a corresponding position of the SSB; and transmitting the position indication information to UE by means of a transceiver 134. The transceiver 134 is connected to the bus interface 132 and configured to receive and transmit data under the control of the processor 131.

It is noted, in FIG. 13, a bus architecture may include any quantity of interconnected buses and bridges, such that various circuits including one or more processors represented by the processor 131 and storages represented by the storage 133 are connected to each other. The bus architecture may also connect various other circuits such as peripherals, voltage regulators and power management circuits, which is well known in the art. Therefore, a detailed description thereof is omitted herein. Bus interface provides an interface. The transceiver 134 may include multiple elements, such as a receiver and a transmitter, to allow for communication with various other apparatuses on the transmission medium. The processor 131 is responsible for supervising the bus architecture and normal operation and the storage 133 may store the data currently used by the processor 131 during operation.

It is to be appreciated by a person skilled in the art, all or a part of steps of the foregoing embodiments may be implemented by hardware, or implemented by associated hardware under the control of a computer program. The computer program includes instructions configured to perform a part or all of the steps of the foregoing method, and may be stored in a readable storage medium, which may be any form of storage medium, such as a volatile or non-volatile computer readable storage medium, a transient or non-transient computer readable storage medium.

Optionally, the processor is specifically configured to: transmit the position indication information to the UE by means of PBCH and DMRS.

Specifically, the slot structure information indicates that a slot structure currently used by a base station is a 7-symbol slot structure or a 14-symbol slot structure.

The abovementioned base station may be a base station operating at sub-6 GHz.

The embodiments of the second method of indicating an SSB applied to a base station side are all applicable to the embodiments of the base station and may achieve the same technical effects.

It can be seen from above, the solution provided by some embodiments of the present disclosure effectively solves the problem of a waste of resources caused by that a specialized signaling is needed to indicate a system frame structure.

Some embodiments of the present disclosure further provide a computer readable storage medium storing thereon a computer program, where the computer program is configured to be executed by a processor to implement following steps: determining, according to an SSB serial number of the SSB in a current period and slot structure information corresponding to the SSB, position indication information in an indication signaling for indicating a corresponding position of the SSB; and transmitting the position indication information to UE.

By determining, according to an SSB serial number of the SSB in a current period and slot structure information corresponding to the SSB, position indication information in an indication signaling for indicating a corresponding position of the SSB and transmitting the position indication information to UE, the computer readable storage medium provided by some embodiments of the present disclosure achieves the objective of utilizing the surplus bits of the indication signaling of SSB serial number to indicate frame structure information of the system, such that the UE may be provided with the frame structure information without adding a signaling specialized in indicating the frame structure, thereby conserving resources.

Optionally, a step of transmitting the position indication information to UE includes: transmitting the position indication information to the UE by means of PBCH and DMRS.

Specifically, the slot structure information indicates that a slot structure currently used by a base station is a 7-symbol slot structure or a 14-symbol slot structure.

The abovementioned solution is applicable to a base station operating at sub-6 GHz.

The embodiments of the second method of indicating an SSB applied to a base station side are all applicable to the embodiments of the computer readable storage medium and may achieve the same technical effects.

It can be seen from above, the solution provided by some embodiments of the present disclosure solves the problem that a specialized signaling is needed to indicate system frame structure, thereby wasting resources.

Figure 14:
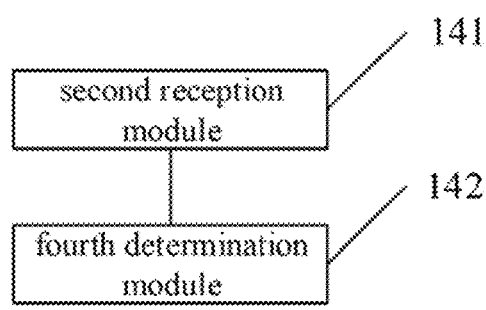
FIG. 14 is a schematic structural diagram of an apparatus of determining an SSB according to some embodiments of the present disclosure.

As shown in FIG. 14, some embodiments of the present disclosure further provide an apparatus of determining an SSB. The apparatus is applicable to a UE side and includes: a second reception module 141, configured to receive position indication information in an indication signaling, transmitted by a base station, indicating a corresponding position of the SSB; and a fourth determination module 142, configured to determine, according to the position indication information, an SSB serial number of the SSB in a current period and slot structure information corresponding to the SSB.

By receiving position indication information in an indication signaling, transmitted by a base station, indicating a corresponding position of the SSB; and determining, according to the position indication information, an SSB serial number of the SSB in a current period and slot structure information corresponding to the SSB, the apparatus of determining an SSB provided by some embodiments of the present disclosure is capable of acquiring the SSB serial number of the SSB in a current period and the slot structure information corresponding to the SSB simultaneously without acquiring the frame structure information by means of a specialized signaling, thus achieving the objective of utilizing the surplus bits of the indication signaling of SSB serial number to indicate frame structure information of the system and thereby conserving resources.

Specifically, the fourth determination module includes: a fourth determination sub-module, configured to determine the slot structure information corresponding to the SSB according to the position indication information and a mapping relationship between a slot structure and position indication information for indicating a position in the indication signaling.

Optionally, the position indication information in the indication signaling for indicating the corresponding position of the SSB includes a serial number of the SSB in the indication signaling, and the slot structure information corresponding to the SSB indicates that a slot structure currently used by the base station is a 7-symbol slot structure or a 14-symbol slot structure.

Accordingly, the fourth determination module performs operation by using following formula:

$$y=\lfloor x/a \rfloor;$$

$$z=\mathrm{mod}(x,a);$$

where y denotes an indicated value of the slot structure information, x denotes the serial number of the SSB in the indication signaling, z denotes the SSB serial number of the SSB in the current period, and a denotes the quantity of SSBs in each synchronization period;

in case that the base station operates at a frequency from 0 GHz to 3 GHz, a is equal to 4, and in case that the base station operates at a frequency from 3 GHz to 6 GHz, a is equal to 8; and y being equal to 0 represents that the slot structure currently used by the base station is a 14-symbol slot structure; and y being equal to 1 represents that the slot structure currently used by the base station is a 7-symbol slot structure.

The abovementioned solution is applicable to UE operating at sub-6 GHz.

The embodiments of the second method of determining an SSB applied to a UE side are all applicable to the embodiments of the apparatus of determining an SSB and may achieve the same technical effects.

It can be seen from above, the solution provided by some embodiments of the present disclosure solves the problem that a specialized signaling is needed to indicate system frame structure, thereby wasting resources.

Some embodiments of the present disclosure further provide UE including: a storage, a processor and a computer program stored on the storage and executable by the processor, where when executing the program, the processor is configured to perform following steps: receiving position indication information in an indication signaling, transmitted by a base station, indicating a corresponding position of the SSB by means of a transceiver; and determining, according to the position indication information, an SSB serial number of the SSB in a current period and slot structure information corresponding to the SSB.

By receiving position indication information in an indication signaling, transmitted by a base station, indicating a corresponding position of the SSB; and determining, according to the position indication information, an SSB serial number of the SSB in a current period and slot structure information corresponding to the SSB, the UE provided by some embodiments of the present disclosure is capable of acquiring the SSB serial number of the SSB in a current period and the slot structure information corresponding to the SSB simultaneously without acquiring the frame structure information by means of a specialized signaling, thus achieving the objective of utilizing the surplus bits of the indication signaling of SSB serial number to indicate frame structure information of the system and thereby conserving resources.

Figure 15:
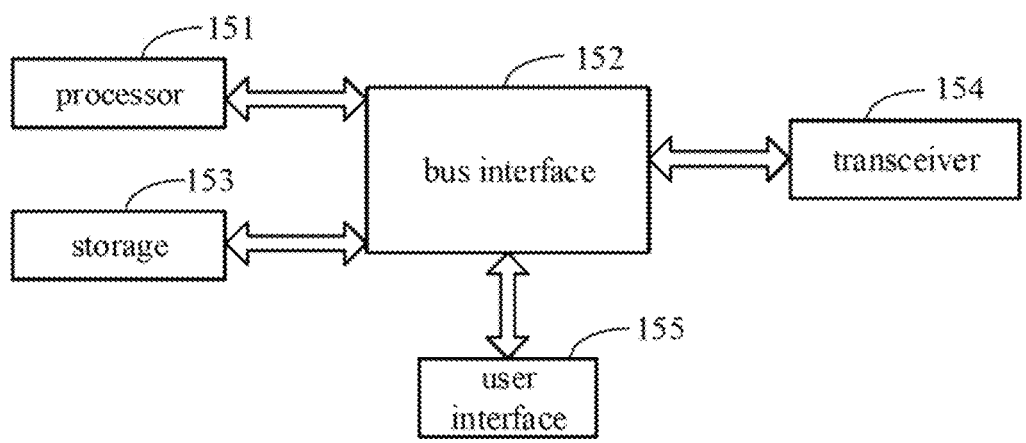
FIG. 15 is a schematic structural diagram of UE according to some embodiments of the present disclosure.

As shown specifically in FIG. 15, the UE provided by some embodiments of the present disclosure includes: a processor 151, and a storage 153 connected to the processor 151 via a bus interface 152, the storage 153 is configured to store program and data used by the processor 151 in operation, the processor 151 is configured to call and execute the program and data stored in the storage 153 to implement the following process: receiving position indication information in an indication signaling, transmitted by a base station, indicating a corresponding position of the SSB by means of a transceiver 154; and determining, according to the position indication information, SSB serial number of the SSB in a current period and slot structure information corresponding to the SSB.

The transceiver 154 is connected to the bus interface 152 and configured to receive and transmit data under the control of the processor 151.

It is noted, in FIG. 15, a bus architecture may include any quantity of interconnected buses and bridges, such that various circuits including one or more processors represented by the processor 151 and storages represented by the storage 153 are connected to each other. The bus architecture may also connect various other circuits such as peripherals, voltage regulators and power management circuits, which is well known in the art. Therefore, a detailed description thereof is omitted herein. Bus interface provides an interface. The transceiver 154 may include multiple elements, such as a receiver and a transmitter, to allow for communication with various other apparatuses on the transmission medium. For different UE, user interface 155 may be an interface configured to connect to a requisite device externally or internally, and the connected device includes, but not limited to: a keypad, display, speaker, microphone, joystick, etc. The processor 151 is responsible for supervising the bus architecture and normal operation and the storage 153 may store the data currently used by the processor 151 during operation.

It is to be appreciated by a person skilled in the art, all or a part of steps of the foregoing embodiments may be implemented by hardware, or implemented by associated hardware under the control of a computer program. The computer program includes instructions configured to perform a part or all of the steps of the foregoing method, and may be stored in a readable storage medium, which may be any form of storage medium, such as a volatile or non-volatile computer readable storage medium, a transient or non-transient computer readable storage medium.

Optionally, the processor is specifically configured to: receive position indication information in an indication signaling, transmitted by the base station, indicating a corresponding position of the SSB by means of a synchronization detection and a PBCH detection.

Specifically, the processor is configured to: determine the slot structure information corresponding to the SSB according to the position indication information and a mapping relationship between a slot structure and position indication information for indicating a position in the indication signaling.

Optionally, the position indication in formation in the indication signaling for indicating the corresponding position of the SSB includes a serial number of the SSB in the indication signaling, and the slot structure information corresponding to the SSB indicates that a slot structure currently used by the base station is a 7-symbol slot structure or a 14-symbol slot structure.

Accordingly, the processor is configured to determine, according to the position indication information, the SSB serial number of the SSB in a current period and the slot structure information corresponding to the SSB by using following formula:

$$y=\lfloor x/a \rfloor;$$

$$z=\mathrm{mod}(x,a);$$

where y denotes an indicated value of the slot structure information, x denotes the serial number of the SSB in the indication signaling, z denotes the SSB serial number of the SSB in a current period, a denotes the quantity of SSBs in each synchronization period; in case that the base station operates at a frequency from 0 GHz to 3 GHz, a is equal to 4, and in case that the base station operates at a frequency from 3 GHz to 6 GHz, a is equal to 8; y being equal to 0 denotes that the slot structure currently used by the base station is a 14-symbol slot structure; and y being equal to 1 denotes that the slot structure currently used by the base station is a 7-symbol slot structure.

The abovementioned UE may be UE operating at sub-6 GHz.

The embodiments of the second method of determining an SSB applied to a UE side are all applicable to the embodiments of the UE and may achieve the same technical effects.

It can be seen from above, the solution provided by some embodiments of the present disclosure solves the problem that a specialized signaling is needed to indicate system frame structure, thereby wasting resources.

Some embodiments of the present disclosure further provide a computer readable storage medium storing thereon, a computer program, where the computer program is configured to be executed by a processor to implement following steps: receiving position indication information in an indication signaling, transmitted by a base station, indicating a corresponding position of the SSB; and determining, according to the position indication information, an SSB serial number of the SSB in a current period and slot structure information corresponding to the SSB.

By receiving position indication information in an indication signaling, transmitted by a base station, indicating a corresponding position of the SSB; and determining, according to the position indication information, an SSB serial number of the SSB in a current period and slot structure information corresponding to the SSB, the computer readable storage medium provided by some embodiments of the present disclosure is capable of acquiring the SSB serial number of the SSB in a current period and the slot structure information corresponding to the SSB simultaneously without acquiring the frame structure information by means of a specialized signaling, thus achieving the objective of utilizing the surplus bits of the indication signaling of SSB serial number to indicate frame structure information of the system and thereby conserving resources.

Optionally, a step of receiving position indication information in an indication signaling, transmitted by a base station, indicating a corresponding position of the SSB includes: receiving position indication information, transmitted by the base station, indicating a corresponding position of the SSB in an indication signaling by means of a synchronization detection and a PBCH detection.

Specifically, a step of determining, according to the position indication information, a slot structure information corresponding to the SSB includes; determining the slot structure information corresponding to the SSB according to the position indication information and a mapping relationship between a slot structure and position indication information for indicating a position in the indication signaling.

Optionally, the position indication information in the indication signaling for indicating the corresponding position of the SSB includes a serial number of the SSB in the indication signaling, and the slot structure information corresponding to the SSB indicates that a slot structure currently used by the base station is a 7-symbol slot structure or a 14-symbol slot structure.

Accordingly, a step of determining, according to the position indication information, an SSB serial number of the SSB in a current period and slot structure information corresponding to the SSB may be implemented by using following formula:

$$y=\lfloor x/a \rfloor;$$

$$z=\mathrm{mod}(x,a);$$

where y denotes an indicated value of the slot structure information, x denotes the serial number of the SSB in the indication signaling, z denotes the SSB serial number of the SSB in a current period, a denotes the quantity of SSBs in each synchronization period; in case that the base station operates at a frequency from 0 GHz to 3 GHz, a is equal to 4, and in case that the base station operates at a frequency from 3 GHz to 6 GHz, a is equal to 8; y being equal to 0 denotes that the slot structure currently used by the base station is a 14-symbol slot structure; and y being equal to 1 denotes that the slot structure currently used by the base station is a 7-symbol slot structure.

The abovementioned solution is applicable to UE operating at sub-6 GHz.

The embodiments of the second method of determining an SSB applied to a UE side are all applicable to the embodiments of the computer readable storage medium and may achieve the same technical effects.

It can be seen from above, the solution provided by some embodiments of the present disclosure solves the problem that a specialized signaling is needed to indicate system frame structure, thereby wasting resources.

It is noted, many functional components described in this specification are referred to as module/sub-module/unit, so as to emphasize the independence of its implementation more expressly.

In some embodiments of the present disclosure, the module/sub-module/unit may be implemented in software, so as to be executed by various types of processors. For example, an identified executable code module may include one or more physical or logical blocks of computer instructions, e.g., implemented as an object, process or function. Nevertheless, it is unnecessary for executable codes of the identified module to be located at the same place physically, instead, the identified module may include different instructions stored at different positions. When the instructions are combined logically, the instructions constitute a module and achieve the stipulated purpose of the module.

In practice, the executable code module may include one or more instructions, may even be distributed over a plurality of different code segments, may be distributed in different programs, or may be distributed over a plurality of storage devices. Likewise, operation data may be identified in module, and may be implemented in any appropriate form and organized in any appropriate type of data structure. The operation data may be collected as a single data set or may be distributed over different positions (including on different storage devices), and the operation data may at least in part reside in a system or network as electronic signals only.

In case that a module may be implemented in software, considering the level of related hardware process, the corresponding functions of each module which may be implemented in software may be achieved by building a corresponding hardware circuit by a person skilled in the art despite of the cost. The hardware circuit includes, a common very large scale integration (VLSI) circuit or gate array, related semiconductor element such as logical chip and transistor, or other discrete element. The module may also be implemented with a programmable hardware device, such as a field programmable gate array, programmable logic array, or programmable logic device.

The above descriptions merely describe optional implementations of the present disclosure. It should be noted that modifications and improvements may be made by a person of ordinary skill in the art without departing from the principle of the present disclosure, and these modifications and improvements shall fall within the scope of the present disclosure.

What is claimed is:

1. A method of indicating a synchronization signal block (SSB), comprising:
   determining a target pattern from a plurality of patterns and acquiring serial number information corresponding to the SSB based on the target pattern;
   determining, according to the serial number information corresponding to the SSB, position indication information in an indication signaling for indicating a corresponding position of the SSB; and
   transmitting the position indication information to a user equipment (UE);
   wherein determining, according to the serial number information corresponding to the SSB, the position indication information in the indication signaling for indicating the corresponding position of the SSB comprises:
   determining the position indication information in the indication signaling for indicating the corresponding position of the SSB according to a position of the SSB in a pattern and an identifier of the pattern;
   wherein, before determining, according to the serial number information corresponding to the SSB, the position indication information in the indication signaling for indicating the corresponding position of the SSB, the method further comprises:
   establishing a mapping relationship between the plurality of patterns and the position indication information in the indication signaling according to priority information of the plurality of patterns.

2. The method according to claim 1, wherein determining the position indication information in the indication signaling for indicating the corresponding position of the SSB according to the position of the SSB in the pattern and the identifier of the pattern comprises:
   determining a corresponding serial number of the SSB in the indication signaling according to a serial number of the SSB in the pattern and a serial number of the pattern.

3. The method according to claim 1, wherein transmitting the position indication information to the UE comprises:
   mapping a part of the position indication information onto a predetermined demodulation reference signal (DMRS) sequence according to the identifier of the pattern and transmitting the DMRS sequence.

4. The method according to claim 1, wherein, in the plurality of patterns, first synchronization signal blocks (SSBs) start from symbol 1 of respective slots, or start from symbol 2 of the respective slots, or some of the first SSBs start from symbol 1 of the respective slots and other of the first SSBs start from symbol 2 of the respective slots.

5. The method according to claim 1, wherein the serial number information further comprises an SSB serial number of the SSB in a current period and slot structure information corresponding to the SSB, the slot structure information indicates that a slot structure currently used by a base station is a 7-symbol slot structure or a 14-symbol slot structure.

6. A method of determining a synchronization signal block (SSB), comprising:
   receiving position indication information in an indication signaling for indicating a corresponding position of the SSB, and the position indication information being transmitted by a base station; and
   determining, according to the position indication information, a slot and a position in the slot where an initial symbol of the SSB is located;
   wherein the position indication information is acquired by the base station based on a target pattern and the position indication information is determined by the base station according to a position of the SSB in a pattern and an identifier of the pattern;
   wherein before the position indication information is determined by the base station according to the position of the SSB in the pattern and the identifier of the pattern, a mapping relationship is established by the base station between a plurality of patterns and the position indication information in the indication signaling according to priority information of the plurality of patterns.

7. The method according to claim 6, wherein determining, according to the position indication information, the slot and the position in the slot where the initial symbol of the SSB is located comprises:
   determining serial number information corresponding to the SSB according to the position indication information; and
   determining the slot and the position in the slot where the initial symbol of the SSB is located according to the serial number information.

8. The method according to claim 7, wherein determining the serial number information corresponding to the SSB according to the position indication information comprises:
   determining an identifier of a pattern corresponding to the SSB and the position of the SSB in the pattern according to the position indication information.

9. The method according to claim 8, wherein determining the slot and the position in the slot where the initial symbol of the SSB is located according to the serial number information comprises:
   determining the slot and the position in the slot where the initial symbol of the SSB is located according to the identifier of the pattern corresponding to the SSB and the position of the SSB in the pattern.

10. The method according to claim 8, wherein the position indication information in the indication signaling for indicating the corresponding position of the SSB comprises a serial number of the SSB in the indication signaling, the identifier of the pattern corresponding to the SSB comprises a serial number of the pattern corresponding to the SSB, and the position of the SSB in the pattern refers to a serial number of the SSB in the pattern.

11. The method according to claim 10, wherein determining the identifier of the pattern corresponding to the SSB and the position of the SSB in the pattern according to the position indication information is implemented by using following formula:

$$y=\lfloor x/a \rfloor;$$

$$z=\mathrm{mod}(x,a);$$

wherein y denotes the serial number of the pattern corresponding to the SSB, x denotes the serial number of the SSB in the indication signaling, z denotes the serial number of the SSB in the pattern, and a denotes a quantity of synchronization signal blocks (SSBs) in each synchronization period; and in case that the base station operates at a frequency from 0 GHz to 3 GHz, a is equal to 4, and in case that the base station operates at a frequency from 3 GHz to 6 GHz, a is equal to 8.

12. The method according to claim 6, further comprising:
determining, according to the position indication information, an SSB serial number of the SSB in a current period and slot structure information corresponding to the SSB.

13. The method according to claim 12, wherein determining, according to the position indication information, the slot structure information corresponding to the SSB comprises:
determining the slot structure information corresponding to the SSB according to the position indication information and a mapping relationship between a slot structure and position indication information for indicating a position in the indication signaling.

14. The method according to claim 12, wherein the position indication information in the indication signaling for indicating the corresponding position of the SSB comprises a serial number of the SSB in the indication signaling, and the slot structure information corresponding to the SSB indicates that a slot structure currently used by the base station is a 7-symbol slot structure or a 14-symbol slot structure.

15. The method according to claim 14, wherein determining, according to the position indication information, the SSB serial number of the SSB in the current period and the slot structure information corresponding to the SSB is implemented by using following formula:

$$y=\lfloor x/a \rfloor;$$

$$z=\mathrm{mod}(x,a);$$

wherein y denotes an indicated value of the slot structure information, x denotes the serial number of the SSB in the indication signaling, z denotes the SSB serial number of the SSB in the current period, and a denotes a quantity of synchronization signal blocks (SSBs) in each synchronization period;

in case that the base station operates at a frequency from 0 GHz to 3 GHz, a is equal to 4, and in case that the base station operates at a frequency from 3 GHz to 6 GHz, a is equal to 8; and y being equal to 0 represents that the slot structure currently used by the base station is a 14-symbol slot structure; and y being equal to 1 represents that the slot structure currently used by the base station is a 7-symbol slot structure.

16. A base station, comprising:
a storage, a processor and a computer program stored on the storage and executable by the processor, wherein when executing the program, the processor is configured to:
determine a target pattern from a plurality of patterns and acquiring serial number information corresponding to a synchronization signal block (SSB) based on the target pattern;
establish a mapping relationship between the plurality of patterns and position indication information in an indication signaling according to priority information of the plurality of patterns;
determine, according to the serial number information corresponding to the SSB, the position indication information in the indication signaling for indicating a corresponding position of the SSB; and
transmit the position indication information to a user equipment (UE);
wherein the processor is further configured to:
determine the position indication information in the indication signaling for indicating the corresponding position of the SSB according to a position of the SSB in a pattern and an identifier of the pattern.

17. A user equipment, comprising:
a storage, a processor and a computer program stored on the storage and executable by the processor, wherein when executing the program, the processor is configured to perform the method according to claim 6.

* * * * *